Jan. 22, 1924. 1,481,623
J. W. OSBORN
TIRE CHAIN FASTENER AND TIGHTENER
Filed Feb. 10, 1923
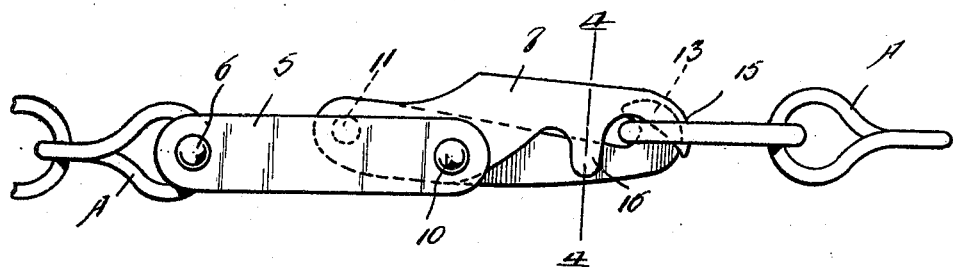
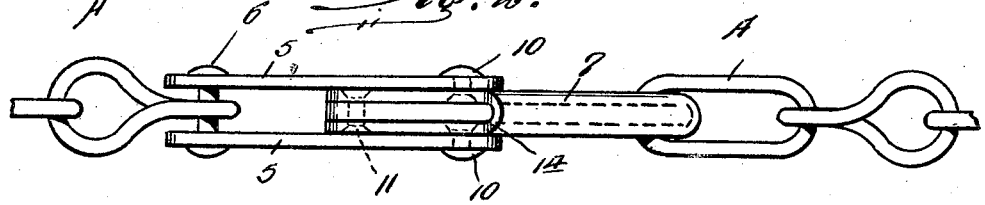
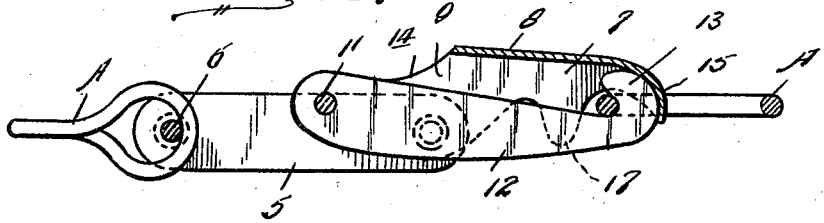
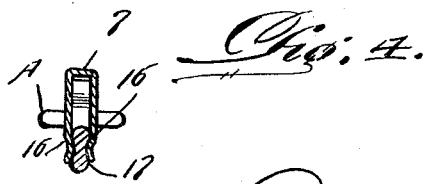

Patented Jan. 22, 1924.

1,481,623

UNITED STATES PATENT OFFICE.

JAMES W. OSBORN, OF HEMINGFORD, NEBRASKA.

TIRE-CHAIN FASTENER AND TIGHTENER.

Application filed February 10, 1923. Serial No. 618,389.

*To all whom it may concern:*

Be it known that I, JAMES W. OSBORN, a citizen of the United States, residing at Hemingford, in the county of Box Butte and State of Nebraska, have invented certain new and useful Improvements in Tire-Chain Fasteners and Tighteners, of which the following is a specification.

My invention relates to improvements in chain fasteners primarily but not specifically adapted for fastening the opposite ends of anti-skid chains now almost universally employed upon motor vehicles, and has for the primary object thereof, the provision of such a device that will not only effectively fasten the ends of these chains, but will also function as a means for tightening the same about the tires for consequently preventing the disengagement of the same therefrom when the vehicle is moving.

A further object of my invention is the provision of such a device that is comparatively simple of construction, and such a fastener that may be readily provided upon practically all makes of anti-skid chains, the device being further characterized by its simplicity of operation.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:

Figure 1 is a side elevational view of a chain tightener and fastener constructed in accordance with the present invention.

Figure 2 is a top plan view thereof.

Figure 3 is a vertical longitudinal cross sectional view of the device, and

Figure 4 is a vertical cross sectional view upon the line 4—4 of Figure 1.

The device constitutes the provision of a pair of link members 5 arranged in parallelism and maintained in spaced apart relation by a spacing rivet 6 engaging through alined openings adjacent the rear ends of said links 5.

Between the front ends of said links 5 is what may be termed a locking lever 7 embodying integrally formed top and side walls 8 and 9 respectively. This lever 7 is pivotally joined between the links 5 at the front ends thereof by rivets 10 engaging through openings in said links, and in the side walls 9 of the lever, the latter mentioned openings being spaced inwardly from the inner end of said lever 7.

Pivotally secured to the inner end of the lever 7 as at 11 is one end of an arm member 12, the opposite end thereof being hooked as at 13.

One end link of the tire chain A is connected to the device through the instrumentality of the spacing rivets 6, and after the chain has been positioned upon a tire, the locking lever 7 is swung upwardly. This movement of the lever 7 will occasion a downward and forward movement of the arm 12, at which time, the adjacent link of the opposite end of the chain may be engaged over the hooked end 13 of said arm 12. On swinging the lever 7 in a downward direction upon its pivot pins 10, the arm 12 will be moved upwardly and retracted between the links 5, for consequently tightening the chain upon the tire.

The top and side walls 8 and 9 constituting the lever are cut away at the rear end thereof as at 14 for permitting the arm 12 to swing freely upon the pivot 11. The lever 7 is further formed at its front end with an overhanging lip portion 15 which engages over the hooked end 13 of the arm 12 for effectively preventing disengagement of the chain link therefrom.

As a means for preventing casual displacement of the lever 7 with respect to the arm 12 when they are in position as shown in the drawing, the side walls 9 of said lever are formed adjacent their front ends with pendent spring legs 16, the lower ends of which are curved inwardly for engaging notches 17 in the side walls of said arm 12 when the lever 7 is in a locked position.

In view of the above description of my improved chain fastener and tightener, I am of the opinion that the advantages and operation thereof will be readily appreciated by those skilled in the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent is:

1. A tire chain fastener including an arm member having a hook formed at one end for receiving a link of the tire chain, a locking lever pivoted to said arm member at the other end thereof, and adapted for association with the arm member to prevent disengagement of the link from the hook in locked position, and links connected with the intermediate portion of the rocking lever at one side thereof and connected with a link at the opposite end of said chain whereby in locked position a pull on the fastener from the chain will act on said arm member for moving the rocking member about its pivot with the link for forcing it in tighter relation with said arm member.

2. A tire chain fastener including an arm member having a hook at one end for receiving a link at one end of a chain, a locking lever of U-shaped cross section pivotally connected at one end with the other end of said arm member and having the opposite end thereof adapted for association and binding relation with said hook on the arm member for preventing disengagement of the link of said chain therefrom, and a pair of links connected to the opposite ends of said tire chains and pivotally connected with the lock between the ends thereof and at one side of said lever whereby when the link of the tire chain is engaged in the hook of the arm member and the locking member is subsequently moved for moving the arm member in rocking relation therewith, the line of pull between the hooks and the pivotal connection of the locking lever with the arm member will move past the pivot of the links with the locking lever when the arm member and locking lever are associated in locking relation, so that a subsequent pull on said fastener by the tire chain will exert a greater rocking action between the rocking lever and arm member.

In testimony whereof I affix my signature.

JAMES W. OSBORN